United States Patent
Suzuki et al.

(10) Patent No.: US 7,613,100 B2
(45) Date of Patent: Nov. 3, 2009

(54) OPTICAL PICKUP DEVICE AND FOCUS CONTROL METHOD THEREFOR

(75) Inventors: Kozo Suzuki, Ota (JP); Shigeru Nakamura, Tachikawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 580 days.

(21) Appl. No.: 11/237,180

(22) Filed: Sep. 28, 2005

(65) Prior Publication Data
US 2006/0114794 A1 Jun. 1, 2006

(30) Foreign Application Priority Data
Sep. 28, 2004 (JP) ............................. 2004-281075

(51) Int. Cl.
*G11B 7/135* (2006.01)
*G41J 2/435* (2006.01)
(52) U.S. Cl. ................... 369/286; 369/59.11; 347/253; 347/224; 347/225
(58) Field of Classification Search ............. 369/44.35, 369/47.51, 59.11, 284, 275.3, 275.4, 286; 720/18; 347/251, 247, 224, 225, 253
See application file for complete search history.

(56) References Cited

U.S. PATENT DOCUMENTS

| | | | |
|---|---|---|---|
| 6,490,239 B1 * | 12/2002 | Nagasaka | 369/275.4 |
| 6,754,158 B1 * | 6/2004 | Kobayashi et al. | 369/59.11 |
| 6,778,205 B2 * | 8/2004 | Anderson et al. | 347/251 |
| 7,082,094 B2 | 7/2006 | Morishima et al. | |
| 7,331,055 B2 * | 2/2008 | Onodera et al. | 720/718 |
| 2004/0169717 A1 * | 9/2004 | Bronson | 347/247 |

FOREIGN PATENT DOCUMENTS

| | | |
|---|---|---|
| CN | 1416114 A | 5/2003 |
| EP | 1385152 B1 | 4/2006 |
| JP | 2002-203321 | 7/2002 |

OTHER PUBLICATIONS

Chinese Office Action, "Notification of First Office Action," State Intellectual Property Office of P.R. China (China), (Dec. 1, 2006).

* cited by examiner

*Primary Examiner*—Hoa T Nguyen
*Assistant Examiner*—Kim-Kwok Chu
(74) *Attorney, Agent, or Firm*—Pillsbury Winthrop Shaw Pittman LLP

(57) ABSTRACT

An optical pickup device comprises a first laser light source and a second laser light source that emit first laser light and second laser light, respectively, and further comprises an objective lens that receives the first and second laser light. The first laser light and the second laser light have different focal lengths from a principal point of the objective lens in accordance with a distance between a signal layer of a signal recording medium and a label layer of the signal recording medium. When the first laser light source and the second laser light source are simultaneously driven, the first laser light and the second laser light are controlled to simultaneously focus on the signal layer of the signal recording medium and the label layer of the signal recording medium, respectively. Thus, label information can be recorded simultaneously with recording of main information.

5 Claims, 3 Drawing Sheets

OPTICAL PICKUP DEVICE AND FOCUS CONTROL METHOD THEREFOR

CROSS-REFERENCE TO RELATED APPLICATION

The entire disclosure of Japanese Patent Application No. 2004-281075 including the specification, claims, drawings, and abstract is incorporated herein by reference.

BACKGROUND OF THE INVENTION

1. Field of the Invention

The present invention relates to an optical pickup device capable of recording label information onto a label layer of a signal recording medium, and a focus control method therefor.

2. Description of the Related Art

DVD drives for recording and reproducing data to and from a DVD (digital versatile disc) are widely available. In most cases, a DVD drive incorporates an optical pickup device that can ensure compatibility with a CD (compact disc). Such an optical pickup device has two types of sources of laser light that emit two types of laser light having different wavelengths, such as two types of laser diodes, one of which emits a beam of laser having a suitable wavelength for the recording density of DVDs, and the other of which emits a beam of laser having a suitable wavelength for the recording density of CDs. By switching between the sources of light in accordance with the recording density of a disc in use, a single optical pickup device can be compatible with both DVDs and CDs having different recording densities.

When measured from a surface of a transparent substrate to a signal layer, a DVD has a thickness of 0.6 mm, whereas a CD has a thickness of 1.1 mm. In other words, the thicknesses of the transparent substrates are significantly different at a ratio of approximately 1 to 2. In a DVD and CD compatible optical pickup device, different NAs (numerical apertures) are required of an objective lens to achieve suitable optical characteristics for the respective types of discs. Therefore, when compatibility with both DVDs and CDs is provided using a single objective lens, the optical pickup device employs a two-focal-length objective lens configured to provide suitable NAs for the respective types of discs.

In order to identify the content of information recorded on a disc after the recording, the disc may be labeled with label information indicating the content of the recorded information.

Typically, such labeling of a disc with label information is provided by printing or handwriting the label information on a label surface of the disc. Recently, a technique that uses laser light applied from an optical pickup device to record the label information in the form of a visible image on a heat-sensitive label layer formed in the disc has been developed.

Currently, the recording of a visible image that represents label information is performed after completion of recording of main information that is to be recorded on a signal layer of a disc. However, if label information can be automatically recorded simultaneously with the recording of main information, the overall recording time can be shortened. Further, it is possible to eliminate the inconveniences associated with the operational steps required for recording of label information. Further, it is also possible to record main information and label information without creating a mismatch therebetween.

SUMMARY OF THE INVENTION

According to one aspect of the present invention, there is provided an optical pickup device comprising a first laser light source and a second laser light source, and an objective lens, wherein first laser light emitted from the first laser light source and second laser light emitted from the second laser light source have different focal lengths from a principal point of the objective lens in accordance with a distance between a signal layer, on which a main information signal is to be recorded, of a signal recording medium and a label layer, on which label information is to be recorded, of the signal recording medium, and, when the first laser light source and the second laser light source are simultaneously driven, the first laser light and the second laser light are adjusted to simultaneously focus on the signal layer of the signal recording medium and the label layer of the signal recording medium, respectively.

BRIEF DESCRIPTION OF THE DRAWINGS

A preferred embodiment of the present invention will be described in further detail based on the following drawings, wherein.

DESCRIPTION OF PREFERRED EMBODIMENT

Figure 1:
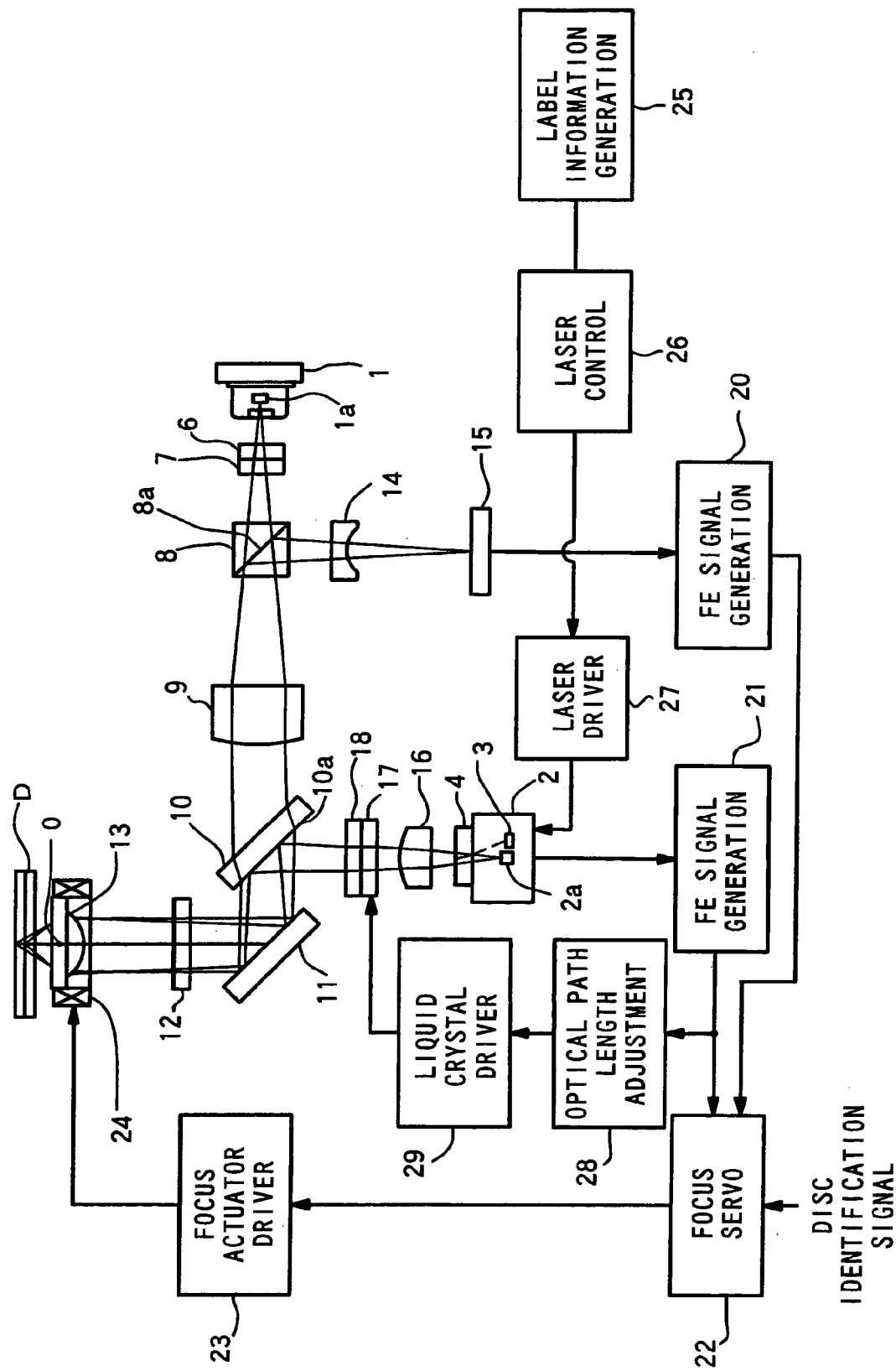
FIG. 1 is a block diagram showing optical systems and a focus servo system of an optical pickup device according to an example embodiment of the present invention.

FIG. 1 shows an arrangement of optical systems provided in an optical pickup device according to an example embodiment of the present invention.

As shown in FIG. 1, the optical pickup device is configured to be compatible with both DVDs and CDs. The optical pickup device is provided with a laser unit 1 including a first laser diode 1a that emits first laser light having a first wavelength in the red wavelength range of 645 nm to 675 nm, for example, a wavelength of 650 nm, which is suitable for DVDs, and is also provided with a light emission and detection unit 2 including a second laser diode 2a that emits second laser light having a second wavelength in the infrared wavelength range of 765 nm to 805 nm, for example, a wavelength of 780 nm, which is suitable for CDs. In other words, the second laser light has a longer wavelength than the first laser light emitted from the first laser light source, and is suitable for a signal recording medium having a greater thickness of a transparent substrate as measured from a surface to a signal layer. The second laser diode 2a can be used in recording and/or reproducing a signal to and from a signal recording medium that is suitable for the second laser light, and can also be used in recording label information.

In addition to the second laser diode 2a, the light emission and detection unit 2 includes a photodetector 3. The second laser diode 2a and the photodetector 3 are mounted in the same package. The photodetector 3 receives reflected light of the second laser light that is reflected by a disc. A hologram element 4 is mounted on a window of the package, and functions as an optical path divider. The hologram element 4 includes an optical path dividing diffraction grating, through which reflected light of the second laser light emitted from the second laser diode 2a is separated from an optical path of the second laser light so that the separated light is guided to the photodetector 3. The optical path dividing diffraction grating is formed on a surface of the hologram element 4 on a side closer to a disc. In addition, another diffraction grating for dividing laser light into three beams that are to be used in tracking control is also formed on a surface of the hologram element 4 on a side closer to the second laser diode 2a.

The first laser diode 1a emits the first laser light having the first wavelength. The first laser light is diffracted through a diffraction grating 6 to produce ±1st-order diffracted light for use in tracking control. After that, the first laser light is adjusted through a ½ wave plate 7 to have a direction of polarization such that double refraction in a transparent substrate of a disc is reduced, and is then supplied to a polarization filter surface 8a of a polarization prism 8 in a transmission direction. The polarization filter surface 8a is configured to have the characteristics of transmitting the first laser light with the direction of polarization adjusted through the ½ wave plate 7. Therefore, the first laser light passes through the polarization filter surface 8a of the polarization prism 8, and, after being collimated through a collimator lens 9, the collimated first laser light is supplied to a parallel-plate-type beam splitter 10 in a transmission direction.

The beam splitter 10 serves to enable the laser unit 1 and the light emission and detection unit 2 to be arranged on different optical paths. A filter surface 10a of the beam splitter 10 functions as a reflective surface that reflects the second laser light emitted from the light emission and detection unit 2, and has the wavelength selective characteristics of a dichroic filter. A selectively reflective and transmissive coating provided on the filter surface 10a transmits almost all of the first laser light of 650 nm, and reflects almost all of the second laser light of 780 nm.

A bend-up mirror 11 is used to reflect the first laser light transmitted through the beam splitter 10 so that the optical axis is bent at right angles. After that, the first laser light passes through a wavelength selective ¼ wave plate 12 that effectively changes only the first laser light of 650 nm, and then enters an objective lens 13. The first laser light converged by the objective lens 13 is applied to a disc D.

The disc D modulates and reflects the first laser light. The reflected first laser light returns to the objective lens 13 to go back along the optical path, through which the laser light has passed before entering the objective lens 13, so that the first laser light again passes through the beam splitter 10, and is returned through the collimator lens 9 to the polarization prism 8.

The first laser light returned to the polarization prism 8 has passed twice in a round trip through the wavelength selective ¼ wave plate 12 that effectively changes only the first laser light. As a result, the direction of polarization is rotated by half the wavelength. The first laser light, which is p-polarized when going to the disc D, is converted to s-polarized light, which in turn enters the polarization prism 8. The first laser light returned to the polarization prism 8 is reflected by the polarization filter surface 8a, and is guided to a photodetector 15 through an anamorphic lens 14 that provides an astigmatism component for generating a focus error component.

A light receiving surface of the photodetector 15 is divided into a plurality of light receiving areas. The first laser light reflected by the disc D is received by the plurality of light receiving areas. Then, the photodetector 15 generates, from each of the plurality of light receiving areas, various types of light reception outputs necessary to produce, for a DVD, a recording signal, a focusing control signal, and a tracking control signal, or a tilt control signal. A computation is performed based on the light reception outputs generated from the respective light receiving areas to produce, for a DVD, a recording signal, a focusing control signal, and a tracking control signal, or a tilt control signal.

On the other hand, the second laser light is divided into three beams through the hologram element 4, and is emitted from the light emission and detection unit 2. The second laser light passes through a divergent lens 16 so that the angle of divergence is adjusted, and further passes through a liquid crystal lens 17 and a ½ wave plate 18. Then, the second laser light reaches the filter surface 10a of the beam splitter 10, by which the optical axis is bent. The second laser light bent by the filter surface 10a is then reflected by the bend-up mirror 11 so that the optical axis is bent in a direction perpendicular to a disc surface. After that, the second laser light passes through the ¼ wave plate 12, and enters the objective lens 13. The second laser light converged by the objective lens 13 is applied to the disc D.

The objective lens 13 has a diffraction grating (not shown) on an incident surface. The diffraction grating, and the objective lens 13 having an aspheric shape, are configured such that combined refraction enables the respective types of laser light having different wavelengths used for DVDs and CDs, respectively, to have desired characteristics suitable for recording and playback of a disc. The first laser light suitable for DVDs is incident on a predetermined area in the form of collimated light, and the second laser light suitable for CDs is incident on a predetermined area with a predetermined angle of divergence. As a result, it is possible to provide suitable NAs and aberration-corrected laser spots for recording and playback of a DVD and a CD, respectively.

The second laser light modulated and reflected by a signal surface of the disc D returns to the objective lens 13, and is further returned through the ¼ wave plate 12 and the bend-up mirror 11 to the beam splitter 10. The second laser light is reflected on the filter surface 10a of the beam splitter 10, and passes through the ½ wave plate 18, the liquid crystal lens 17, and then the divergent lens 16 before being returned to the light emission and detection unit 2.

The second laser light returned to the light emission and detection unit 2, whose optical axis is bent at the hologram element 4, is detected by the photodetector 3.

As described above, the second laser light is detected by the photodetector 3 provided within the light emission and detection unit 2. In response to this, the photodetector 3 produces a recording signal for a CD, and also produces control signals to be used in focusing control and tracking control for a CD.

In this structure, the liquid crystal lens 17 is designed to have an action of a lens by arranging the liquid crystal to concentrically change the degree of phase change in a step-by-step manner.

Next, a structure of a disc will be described before a focus servo system is described.

Figure 2:
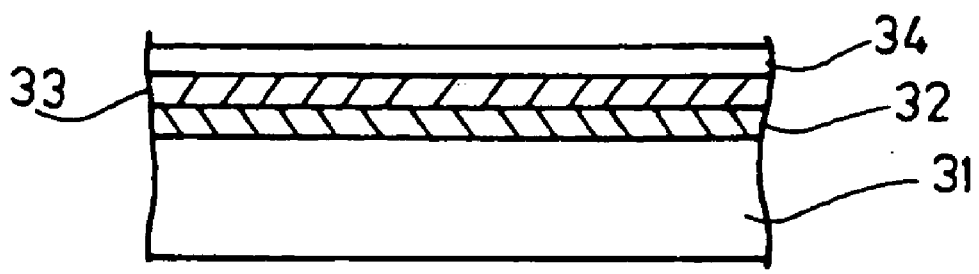
FIG. 2 shows a cross-sectional structure of a recordable disc.

FIG. 2 schematically shows a cross-sectional structure of an R-type recordable disc, such as a DVD-R, a DVD+R, or a CD-R. Although a DVD-R and a DVD+R each have a structure in which two "half-thickness" discs are bonded together, FIG. 2 shows only one of the half-thickness discs.

As shown in FIG. 2, an R-type recordable disc has a structure in which a transparent substrate layer 31, a recording layer 32, a reflective layer 33, and a protective layer 34 are layered, in that order, from an incident surface side on which laser light coming from an optical pickup device is incident.

Figure 3:
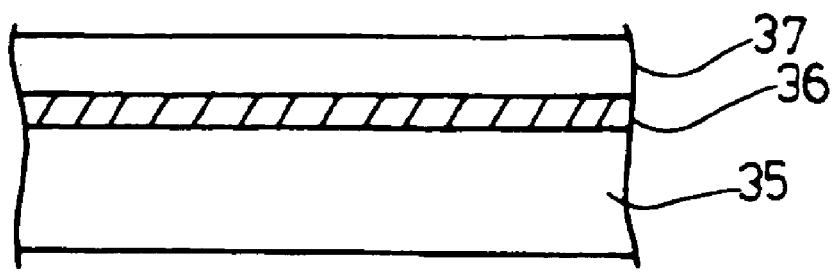
FIG. 3 is an illustrative diagram showing across-sectional structure of a read-only disc.

FIG. 3 schematically shows a cross-sectional structure of a read-only disc, such as a DVD or a CD. Although a DVD has a structure in which two half-thickness discs are bonded together, FIG. 3 shows only one of the half-thickness discs.

As shown in FIG. 3, a read-only disc has a structure in which a transparent substrate layer 35, a reflective layer 36, and a protective layer (or a spacer layer when the disc is a DVD having a bonded-disc structure) 37 are layered, in that order, from an incident surface side on which laser light coming from an optical pickup device is incident. The reflective layer 36 records a main information signal in a data area, a lead-in area, and a lead-out area in the form of a pattern of pits and lands.

Figure 4:
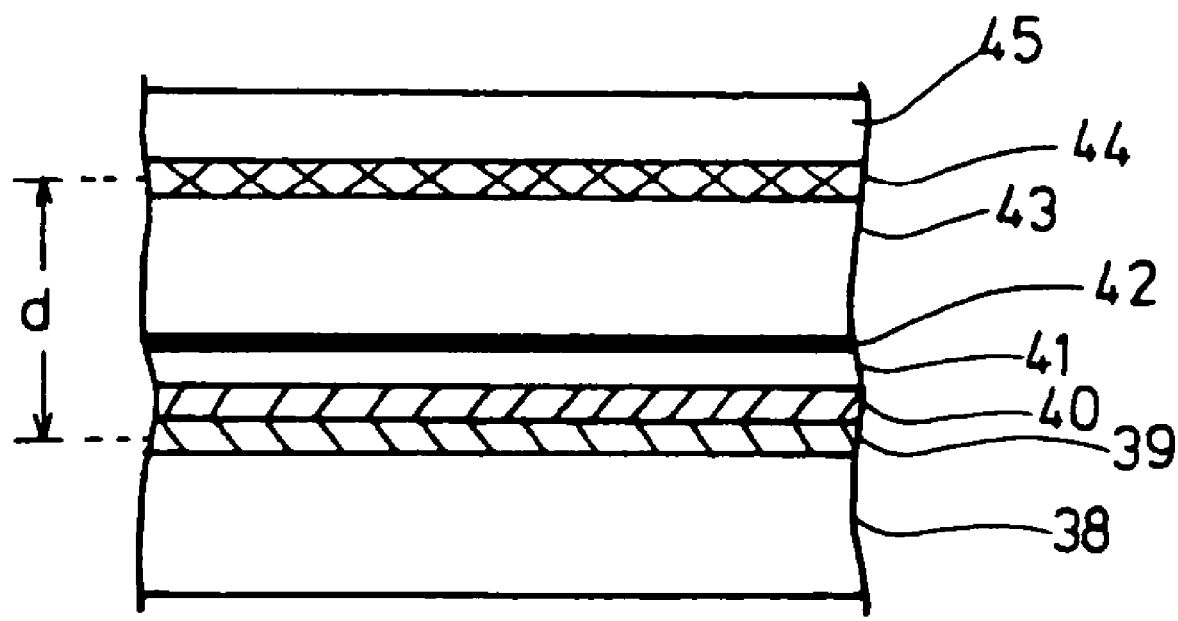
FIG. 4 shows a recordable disc that has a recordable label layer.

FIG. 4 schematically shows a cross-sectional structure of a recordable disc having a label layer that can record a visible image therein. When the disc is a DVD, the disc has a structure in which two half-thickness discs with different structures are bonded together.

As shown in FIG. 4, a recordable disc having a label layer has a structure in which a first transparent substrate layer 38, a recording layer 39, a reflective layer 40, a first protective layer 41, an adhesive layer 42, a second transparent substrate layer 43, a label layer 44, and a second protective layer 45 are layered, in that order, from an incident surface side on which laser light coming from an optical pickup device is incident.

Referring to FIGS. 2 and 4, the recording layers 32 and 39 are formed of an organic dye. In each of the recording layers 32 and 39, a pregroove having positional information data recorded therein is formed in a spiral manner. The organic dye is decomposed by heat generated through application of converged laser light, and thereby forms recording pits. Thus, a main information signal is recorded in the data area, the lead-in area, and the lead-out area. Each of the recording layers 32 and 39 corresponds to a signal layer as recited in the appended claims.

Further, referring to FIGS. 2 to 4, the reflective layers 33, 36, and 40 are provided so that when laser light applied to a disc is detected by the photodetector 15 or 3, the light has a sufficient intensity. When the disc is a read-only disc as shown in FIG. 3, recording pits that record a main information signal are formed in the reflective layer 36. The reflective layer 36 corresponds to a signal layer as recited in the appended claims.

Further, referring to FIG. 4, the reflective layer 40 is configured to be translucent, and the adhesive layer 42 is configured to be transparent, so that the second laser light incident from the incident surface side is allowed to reach the label layer 44. The label layer 44 is formed so as to include a heat-sensitive agent having a heat-sensitive property to respond to heat generated through the application of converged second laser light. Thus, a visible image can be formed by change in color of the heat-sensitive agent.

Next, a focus servo system of the optical pickup device will be described.

Light reception outputs obtained from the respective predetermined light receiving areas of the photodetector 15 of the DVD system are subjected to predetermined arithmetic processing in a focus error signal generation circuit 20 for DVDs (hereinbelow, referred to as "FE signal generation circuit for DVDs"). The FE signal generation circuit 20 for DVDs generates a focus error signal (FE signal) corresponding to an error in focusing that can occur when the first laser light emitted from the first laser diode 1a of the DVD system is to be focused on the signal layer of a DVD (that is, the recording layer 32 or 39 of a recordable disc, or the reflective layer 36 of a read-only disc).

On the other hand, light reception outputs obtained from the respective predetermined light receiving areas of the photodetector 3 contained within the light emission and detection unit 2 of the CD system are subjected to predetermined arithmetic processing in a focus error signal generation circuit 21 for CDs (hereinbelow, referred to as "FE signal generation circuit for CDs"). The FE signal generation circuit 21 for CDs generates a focus error signal (FE signal) corresponding to an error in focusing that can occur when the second laser light emitted from the second laser diode 2a of the CD system is to be focused on the signal layer of a CD (that is, the recording layer 32 of a recordable disc, or the reflective layer 36 of a read-only disc).

FE signals generated from the FE signal generation circuit 20 for DVDs and the FE signal generation circuit 21 for CDs are supplied to a focus servo circuit 22. The focus servo circuit 22 selects one of the FE signals to accept in accordance with a disc identification signal identifying the type of the disc on which recording or playback is to be performed. Then, the focus servo circuit 22 is switched to appropriate equalizer settings in accordance with the disc type associated with the selected FE signal. After that, the focus servo circuit 22 generates a focus servo signal for performing appropriate focus servo control in accordance with the disc type.

The focus servo signal generated from the focus servo circuit 22 is supplied to a focus actuator driver 23. The focus actuator driver 23 provides a focus drive signal to a focus coil 24 for an actuator (not shown) of the objective lens 13. The objective lens 13 is driven by operation of the actuator based on the focus servo signal.

Further, the above-described optical pickup device is configured such that label information can be recorded on a disc including the label layer 44 (refer to FIG. 4), which is sensitive to heat generated by the second laser light emitted from the second laser diode 2a, and which therefore allows recording of label information.

When label information is to be recorded on a DVD having the label layer 44, a label information signal corresponding to a visible image (including characters) to be written is output from a label information generation circuit 25. In response to the label information signal, a laser control circuit 26 supplies a laser control signal (pulse signal) to a laser driver 27. Thus, the second laser light corresponding to the label information signal is emitted from the second laser diode 2a. The second laser light used for this purpose is applied to a DVD through the same path as the second laser light used in recording and reproducing data to and from the signal layer of a CD (that is, the recording layer 32 of a recordable disc, or the reflective layer 36 of a read-only disc).

Further, the recording of label information is performed simultaneously with recording or reproducing of a signal to or from the signal layer of the DVD (that is, the recording layer 32 or 39 of a recordable disc, or the reflective layer 36 of a read-only disc) using the first laser light emitted from the first laser diode 1a. The objective lens 13 is driven by the focus servo system suitably for DVDs so that focus servo control is performed to focus the first laser light on the signal layer of the DVD.

Because of different wavelengths of laser light used for a DVD and a CD, and because of optical systems used in accordance with the difference in thickness of a transparent substrate as measured from the surface to the signal layer, the first laser light and the second laser light converged by the objective lens 13 provided at a fixed position have different focal lengths. When the focus servo system is in a focus servo state suitable for DVDs during recording to or playback from a DVD, the second laser light is focused at a focal point located farther away than the focal point of the first laser light.

During recording of label information, a liquid crystal driver 29 is driven in response to an optical path length adjustment signal generated by an optical path length adjustment circuit 28. The liquid crystal lens 17 functions as a concave lens so that the distance between the focal point of the second laser light and the focal point of the first laser light is increased. As a result, the focal point of the second laser light is adjusted to a standard position of the label recording layer of a DVD in a state in which the first laser light is focused on the signal layer of a DVD.

More specifically, the focal lengths of the first laser light emitted from the first laser diode 1a of the laser unit 1 and the second laser light emitted from the second laser diode 2a of the light emission and detection unit 2 as measured from the principal point "O" of the objective lens 13 are different by a distance "d" between the signal layer (recording layer 39) and the label layer 44. The optical pickup device is configured such that, when the first laser diode 1a and the second laser diode 2a are simultaneously driven, the first laser light and the second laser light are simultaneously focused on the signal layer and the label layer, respectively, of a DVD.

During recording of label information, the FE signal generation circuit 21 for CDs uses predetermined light reception outputs detected by the photodetector 3 contained within the light emission and detection unit 2 to thereby generate a focus error signal representing a focus error between the focal point of the second laser light and the label recording layer 44 of the DVD. The focus error signal is supplied to the optical path length adjustment circuit 28. The liquid crystal driver 29 controls the driving voltage of the liquid crystal lens 17 so as to approximate the focus error signal to "0". In other words, the focal length of the liquid crystal lens 17 used as a concave lens is changed to vary the degree of convergence or divergence of light. Thus, the liquid crystal lens 17 is used to control the second laser light to focus on the label recording layer 44 of the DVD, independently of controlling the first laser light to focus on the signal layer of the DVD.

To control the second laser light to focus on the label recording layer 44 of a DVD, when the response speed of liquid crystal elements used in the liquid crystal lens 17 is considered to be insufficient to accommodate wobbling of a disc, if the focal length of the liquid crystal lens 17 used as a concave lens is set for each disc, it is possible to accommodate variations among discs. In addition, if the focal length of the liquid crystal lens 17 used as a concave lens is set for each predetermined recording/playback position in the direction of the radius of a disc, it is possible to accommodate warping of a disc in the direction of the radius of the disc.

In a structure with the liquid crystal lens 17 used as an optical path length adjustment optical device, because the liquid crystal of the liquid crystal lens 17 may be electrically driven, the structure does not require a drive mechanism that moves the optical device in the direction of the optical axis for adjusting the optical path length of the second laser light. Therefore, it is possible to provide an optical pickup device having a simple device structure.

In a structure with the liquid crystal lens 17 used as an optical path length adjustment optical device, when the focal length of the liquid crystal lens 17 used as a concave lens is set for each disc, it is preferable that the label recording layer 44 of a DVD has an increased heat sensitivity compared with the case where the second laser light is always focused on the label recording layer 44 of a DVD. With an increased heat sensitivity, the label recording layer 44 can record label information, while permitting the second laser light to go out of focus, to some extent, with respect to the label recording layer 44 of the DVD. In such cases, a permissible out-of-focus condition of the second laser light can be considered as an in-focus condition according to the present invention.

It should be noted that there is no need to record label information with as a high degree of precision as is required for recording a main information signal. Therefore, in regard to the degree of precision, there is no problem in that the second laser light has a large spot diameter due to a permissible out-of-focus condition.

As described above, while the first laser light is being focused on the signal layer 39 of a DVD, the second laser light can be focused on the label recording layer 44 of the DVD. Thus, the second laser light can be used to record label information onto the label recording layer 44 of a DVD while the first laser light is being used either to record a main information signal on the signal layer 39 of the DVD, or to reproduce a main information signal recorded on the signal layer 39. Further, substantially different types of laser light can be simultaneously focused on the signal layer and the label layer, respectively, using a simple device structure without requiring a plurality of focus control mechanisms and focus control circuits.

On the other hand, during normal recording or playback of a DVD without recording of label information onto the label layer, the optical pickup device performs focus control in response to light reception outputs provided from the photodetector 15 based on reflected light of the first laser light, and more specifically, the objective lens 13 is driven in the direction of the optical axis using the actuator so that the first laser light emitted from the first laser diode 1a is converged through the objective lens 13 on the signal layer of the DVD (that is, the recording layer 32 or 39 of a recordable disc, or the reflective layer 36 of a read-only disc). Thus, the first laser light can be focused and applied to the signal layer of the DVD to perform recording to or playback from the signal layer.

In addition, during normal recording or playback of a CD, the optical pickup device performs focus control in response to light reception outputs provided from the photodetector 3 of the light emission and detection unit 2 based on reflected light of the second laser light so that the second laser light emitted from the second laser diode 2a of the light emission and detection unit 2 is converged through the objective lens 13 on the signal layer of the CD (that is, the recording layer 32 of a recordable disc, or the reflective layer 36 of a read-only disc). Thus, the second laser light can be focused and applied to the signal layer of the CD to perform recording to or playback from the signal layer.

Further, the optical pickup device uses a light emission and detection unit in which the second laser light source and the photodetector that detects reflected light of the second laser light reflected by a signal recording medium are contained within the same package. If the second laser light needs to have a different optical path length from that of the first laser light, because of the different optical path lengths, a single photodetector cannot be used to detect both the first laser light and the second laser light, and it is therefore necessary to provide independent optical systems in which the first laser light and the second laser light have different optical paths to the respective photodetectors. In such cases, it is possible to easily achieve independent optical systems in which the first laser light and the second laser light have different optical paths to the respective photodetectors in accordance with the different optical path lengths.

What is claimed is:

1. An optical pickup device that emits laser light to a signal recording medium including a label layer, the label layer being capable of recording label information in the form of a visible image through application of laser light, the optical pickup device comprising:
   a first laser light source and a second laser light source that emit first laser light and second laser light, respectively; and
   an objective lens that receives the first and second laser light, the objective lens being shared by the first laser light source and the second laser light source, wherein the first laser light and the second laser light have different focal lengths from a principal point of the objective lens in accordance with a distance between a signal layer of the signal recording medium and the label layer of the signal recording medium, and when the first laser light source and the second laser light source are simultaneously driven, the first laser light and the second laser light are controlled to simultaneously focus on the signal layer of the signal recording medium and the label layer of the signal recording medium, respectively, and wherein the first laser light and the second laser light have different wavelengths from each other, and the second laser light has a longer wavelength than that of the first laser light, the wavelength of the second laser light being suitable for a second signal recording medium in which a transparent substrate has a greater thickness, as measured from a surface to a signal layer, than that of the signal recording medium.

2. An optical pickup device that emits laser light to a signal recording medium including a label layer, the label layer being capable of recording label information in the form of a visible image through application of laser light, the optical pickup device comprising:
   a first laser light source and a second laser light source that emit first laser light and second laser light, respectively, the first laser light source and the second laser light source being arranged in different optical paths;
   an objective lens that receives the first and second laser light, the objective lens being shared by the first laser light source and the second laser light source, wherein the first laser light and the second laser light have different focal lengths from a principal point of the objective lens in accordance with a distance between a signal layer of the signal recording medium and the label layer of the signal recording medium, and when the first laser light source and the second laser light source are simultaneously driven, the first laser light and the second laser light are controlled to simultaneously focus on the signal layer of the signal recording medium and the label layer of the signal recording medium, respectively; and
   a beam splitter for use in providing a difference between respective optical path lengths from the first laser light source and the second laser light source to the objective lens, whereby the first laser light is caused to be incident on the objective lens in the form of collimated light, and the second laser light is caused to be incident on the objective lens with a predetermined angle of divergence.

3. The optical pickup device according to claim 2, further comprising:
   an optical path length adjustment device provided between the beam splitter and the second laser light source to adjust an optical path length of the second laser light before the second laser light is focused by the objective lens; and
   a photodetector that detects the second laser light reflected by the signal recording medium, wherein the optical path length adjustment device is controlled in accordance with a focus error signal obtained based on detection outputs from the photodetector.

4. The optical pickup device according to claim 3, wherein the optical path length adjustment device comprises a liquid crystal lens, and by controlling a phase of liquid crystal of the liquid crystal lens, the optical path length of the second laser light is adjusted to accommodate variations in the distance between the signal layer of the first signal recording medium and the label layer of the signal recording medium.

5. The optical pickup device according to claim 2, further comprising: a photodetector that receives reflected light of the second laser light reflected by the signal recording medium, and is contained within the same package as the second laser light source; and an optical path dividing device that divides reflected light of the second laser light reflected by the first signal recording medium from an optical path extending from the second laser light source to the first signal recording medium to guide the divided light to the photodetector.

* * * * *